April 28, 1953     T. H. AFFLECK     2,636,576
TRAILER LINE CONTROL APPARATUS
Filed Feb. 2, 1948     2 SHEETS—SHEET 1
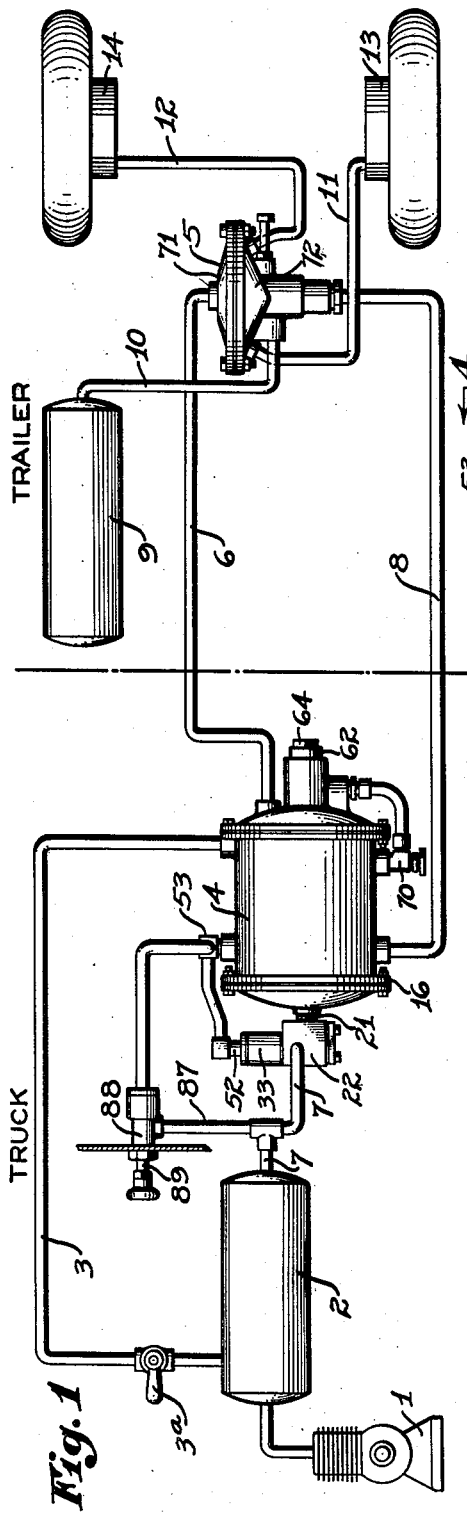
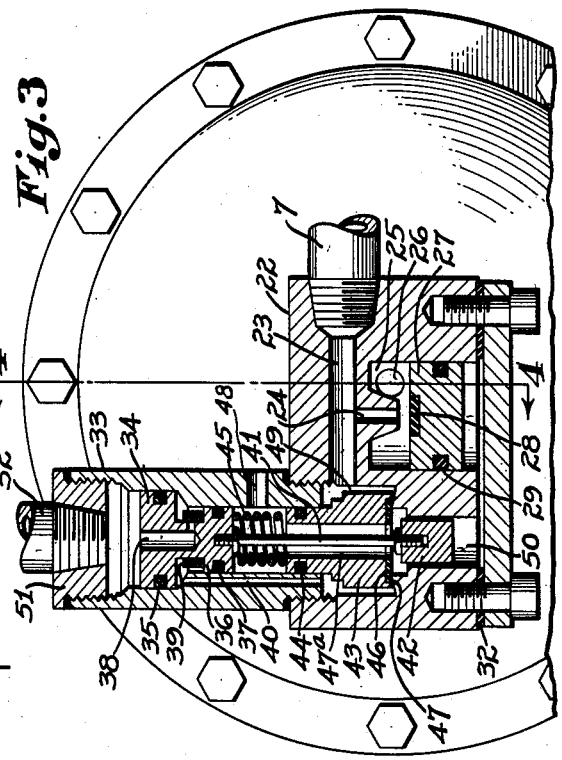
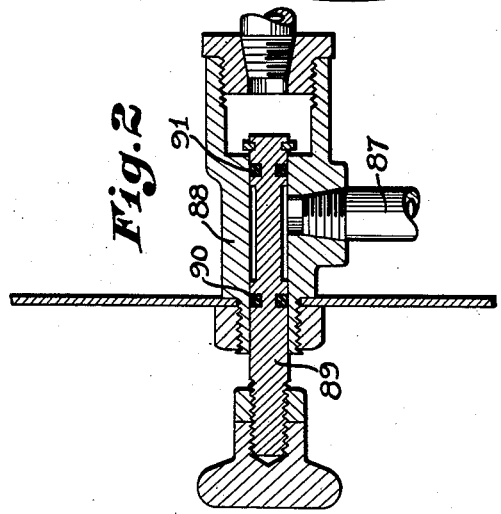
Inventor
THEODORE HUBBARD AFFLECK.
By Lyon & Lyon
Attorneys April 28, 1953  T. H. AFFLECK  2,636,576
TRAILER LINE CONTROL APPARATUS
Filed Feb. 2, 1948  2 SHEETS—SHEET 2

Inventor
THEODORE HUBBARD AFFLECK
By Lyon & Lyon
Attorneys

Patented Apr. 28, 1953

2,636,576

UNITED STATES PATENT OFFICE 2,636,576

TRAILER LINE CONTROL APPARATUS

Theodore Hubbard Affleck, North Hollywood, Calif., assignor to Homer T. Seale, Inc., Los Angeles, Calif., a corporation of California Application February 2, 1948, Serial No. 5,885

10 Claims. (Cl. 188—3)

This invention relates to a trailer line control apparatus intended for use in connection with lines leading from a truck to a trailer. It is a general object of the present invention to provide an apparatus automatically shutting off both lines leading from a truck to a trailer, so that should either of these lines break or become uncoupled, the supply of compressed air in the truck tank will be prevented from escaping to the atmosphere, and the trailer brakes will be applied.

In the operation of the brakes on a trailer attached to a truck there are two lines leading from the truck to the trailer. One of these lines is known as the emergency line and is normally intended to be under air pressure at all times, and is the supply line from the truck tank to the trailer tank through the trailer relay emergency valve mechanism. The other line goes from the control valve on the truck (operated by the brake lever) to the relay emergency valve on the trailer, and this line is only charged with air when an application of the brakes is to be made.

In the past, when the emergency line became uncoupled or ruptured so as to lose pressure, the trailer relay valve mechanism has been designed to cause an emergency application of the trailer brakes. This will result in stopping the truck and trailer, provided the truck and trailer are hitched together; however, should the trailer break away from the truck, the breaking of the emergency line has the effect of rapidly exhausting all air pressure from the truck, so that the truck has no air pressure to apply the truck brakes.

By means of the valve mechanism of the present invention means are provided by which the loss of pressure in the emergency line, through rupture of this line, will automatically shut the emergency line off from the source of air pressure on the truck, whereby the truck operator will retain a source of pressure for setting the truck brakes. This operation is effected without interfering with the usual action of the trailer relay valve mechanism in automatically setting the trailer brake when the emergency line is broken.

Another cause of accidents in operating a truck and trailer arises when the service line becomes ruptured or uncoupled while the emergency line remains connected. In such a case the trailer brakes are not applied, and there is no indication on the truck that such a service line is ruptured. When the truck driver attempts to stop he is unable to set the trailer brakes, and, moreover, the operation of the brake valve connects the source of pressure on the truck to the ruptured service lines, so that the air pressure on the truck is rapidly exhausted interfering with the operation of truck brakes.

By means of the present invention a device is provided by means of which the rupture of a service line will cause application of the trailer brakes, and, moreover, prevent the source of pressure on the truck from being exhausted. By means of the present invention, on severing of the service line, the driver retains full pressure in the truck for setting the truck brakes, and upon applying the brakes the service line is closed and the emergency line drained of air pressure which causes the trailer brakes to go into emergency.

The valve apparatus of the present invention, together with various further objects and advantages of the invention, will be fully understood from the following description of the preferred form of the invention. For this purpose, a preferred example of the invention is described in connection with the accompanying drawings, in which:

Figure 1 is a somewhat diagrammatic view illustrating the complete apparatus for actuating trailer brakes from a truck.

Figure 2 is an enlarged section of the loading valve.

Figure 3 is an end view of the control apparatus, with certain valve parts in section, on the line 3—3 of Figure 4.

Figure 4:
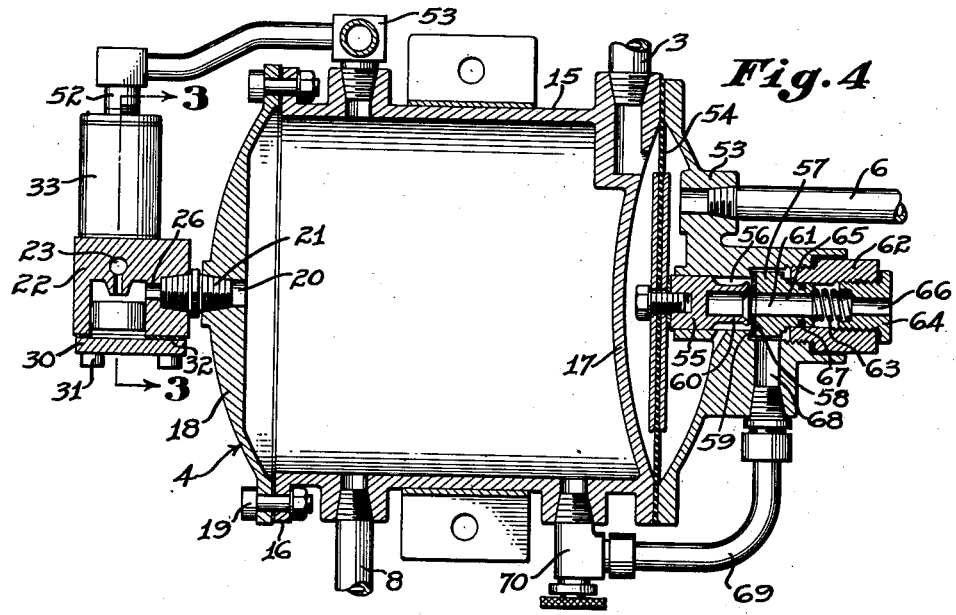
Figure 4 is a vertical section of the control apparatus substantially on the line 4—4 of Figure 3.

Referring first to Figure 1 of the drawings, for the purpose of illustration, I have shown somewhat diagrammatically the control apparatus of the present invention in connection with a substantially complete apparatus for controlling trailer brakes. In the drawings, I represents an air compressor by means of which the usual tank 2 on the truck is supplied with air pressure. From the tank 2 a service line 3 extends to the control apparatus 4. This service line 3 is diagrammatically indicated as provided with a valve 3ᵃ, which is normally operated by the brake pedal of the truck, or by hand, and is movable to a position in which it connects line 3 with tank 2, and the other position, in which it shuts off tank 2 from line 3, and at the same time vents line 3 to the atmosphere. In normal practice of operating trailer brakes, the line 3 leads directly to a relay emergency valve 5 positioned on the trailer, but in the case of the use of the apparatus of the present invention, the service line connecting the truck tank 2 and the relay emergency valve 5 is broken at the first portion 3 leading to the control apparatus, from which, as hereafter described, the second portion 6 of a service line leads to the relay emergency valve apparatus. It is also a conventional practice to provide a second line 7 leading from the truck tank 2 to the relay emergency valve 5, which is the so-called emergency line. In the case of the present invention, this emergency line is broken for the insertion of the control apparatus 4, 8 being the continuation of the emergency line to the relay valve mechanism from the control apparatus 4.

On the trailer there is provided the usual trailer tank 9 connected by the line 10 to the relay emergency valve mechanism 5, and from the relay emergency valve mechanism 5 there leads lines 11 and 12, which connect with the brake cylinders 13 and 14 of the trailer.

Now referring more particularly to Figure 4 of the drawings, the control apparatus of the present invention includes a small tank 15, which is normally intended to be charged with air under pressure from the truck tank 2. As illustrated, this tank 15 has substantially cylindrical side walls 16, which are integral with an end wall 17 at the right, as viewed in the figure. This end wall 17 is shown bowed inwardly somewhat to facilitate, as hereafter described, the mounting of a relay diaphragm. The left end of the tank 15 is closed by the cap member 18 held in position by bolts 19.

The cap member 19 has an opening 20 into which is threaded a hollow connector 21, which serves as a connection and a mounting for a valve casing 22. The valve casing 22 is indicated as having a detachable lower plate 30, held in position by bolts 31 and packing 32. The plate 30 is made separate from the body of the casing merely for convenience in forming the casing. The valve casing 22 has a passage 23 which is connected to the emergency line portion 7, so as to normally be under the full pressure of the truck tank 2. From the passage 23 a bore 24 leads to a passage 25 which connects with the port 26 which leads through the hollow connector 21. In the passage 25 is indicated a valve member 27, which has a packing 28 adapted to in one position close port 24. This valve member 27 is provided with a packing ring 29. Accordingly, whenever the valve member 27 is in the position shown in Figures 3 or 4, the small tank 15 will be maintained under the same pressure as the truck tank 2.

Attached to the casing 22 is a supplemental casing member 33, and within said supplemental casing member 33 and the casing 22 is mounted a movable means which includes a piston member 34, which has an enlarged upper part sealed to a cylindrical bore of the supplemental casing 33 by the sealing ring 35, and a reduced lower portion 36 sealed to a reduced bore by the sealing ring 37. A passage 38 leads through the enlarged end of the piston 34 to discharge between the enlarged and smaller portions of the piston, there being a resilient band 39 which operates as a check valve. From the space between the enlarged and smaller portions of the piston 34 there is a passage 40 through the supplemental casing 33 for the flow of air. A rod 41 is attached to the piston 34 and carries at its lower end a plug 42. There is also provided a valve member 43 which is movable relative to the piston 34, and is guided within the cylindrical bore of the supplemental casing 33 and sealed thereto by the sealing ring 44. A spring 45 normally urges the valve member 43 and piston 34 apart. The valve member 43 has a packing 46 to assist the same in making a seat on an annular ridge 47 of the casing 22. This packing is also adapted for engagement with the plug 42, so that the plug 42 is adapted to close an exhaust passage 47$^a$ which extends axially through the valve member 43 and communicates with the exhaust port 48. The port 23 communicates with a space 49 surrounding the valve member 43, from which flow of air may pass if valve 43 is removed from its seat against ridge 47 through the bore 50 to underneath the valve piston 27.

The upper end of the supplemental casing 33 is closed by a plug 51, to which is connected a line 52, which leads to the three-way connection 53, and thereby establishes communication with the interior of the small tank 15.

In normal operation the valve means in casings 22 and 33 operate as follows. When there is pressure in the small tank 15 this pressure forces the piston member 34 downwardly causing the valve member 43 to engage its seat 47, spring 45 being compressed and plug 42 being moved from seat 46. In this position the valve means shuts off the flow of fluid from port 23 by the valve 46 to below the piston valve member 27. The air underneath the piston valve member 27 is exhausted through the exhaust passages 47$^a$ and 48, so that the orifice 24 is open for the supply of air to the small tank from the truck tank 2. If for any cause, as hereafter explained, sufficient pressure should be lost from the small tank 15, so as to materially drop that pressure to a low pressure, such as about ten pounds gauge, then the spring 45 would force the piston member 34 upwardly causing plug 42 to close the exhaust passage 47$^a$. Air pressure entering passage 23 from the truck tank 2 will be exerted through passage 40 against the under side of the enlarged end of piston 34 sufficiently to move 34 upwardly so as to raise the valve member 43 from its seat 47; whereupon air from passage 23 may pass by the seat under the piston valve member 27 and close that member against the port or orifice 24. Port or orifice 24 should be sufficiently small so that if one of the lines 6 or 8 from the small tank become uncoupled, air will be lost from the small tank 15 faster than it can be supplied through such port or orifice 24. In such an event, then the valve member 27 is rapidly closed against port 24 to prevent bleeding the truck tank 2 of its air pressure. In this way the breakage of lines 6 or 8 are prevented from bleeding the air from the truck tank, so the air in that tank will be available to apply the truck brakes when needed.

To the right side of the small tank 15 is clamped a casing member 53 which, together with the wall 17, forms a diaphragm chamber for a diaphragm 54, which forms part of a relay valve mechanism. The diaphragm 54 is indicated as attached to a follower 55 which is guided into bore 56 of the casing member 53, and the follower 55 has a reduced end 60 so as to allow the flow of air from the right of the diaphragm through ports 61 into the bore 56. The bore 56 is enlarged to accommodate a valve member 57, which has a packing 58 adapted to form a sealing contact with the shoulder 59. The valve member 57 is mounted in a plug 62 threaded to the casing member 53, and is normally urged against its seat by a spring 63 seated in the plug 64. Axial exhaust passages 65 and 66 are provided through the valve member 57 and plug 64, and a sealing ring 67 is provided for the valve member 57. A bore 68 communicates with the bore 56 below the valve seat, and this bore is connected by the line 69 through a valve 70 to the small tank 15. The section 3 of the service line connects with the left side of the diaphragm chamber where the section 6 of the service line connects with the right side of the service line.

By this apparatus it will be seen that the section of the service line 3 merely controls the flow of pressure from the small tank 15 into the seating section of the service line. That is to say, whenever valve 3ª is operated so as to place pressure on line 3, the diaphragm 54 is urged to the right closing the follower 55 against valve member 57 to close the exhaust passages 65 and 66, and at the same time forcing the valve member 57 from its seat against the casing 53, and thereby allowing flow of air from the small tank through line 69 through the chamber to the right of the diaphragm and out of line 6. Whenever valve 3ª is turned to position the exhaust pressure from line 3 the diaphragm is moved to the left closing valve member 57 against its seat, and moving the follower 55 to open the exhaust lines so that air is exhausted from the section 6 of the service line.

Figure 5:
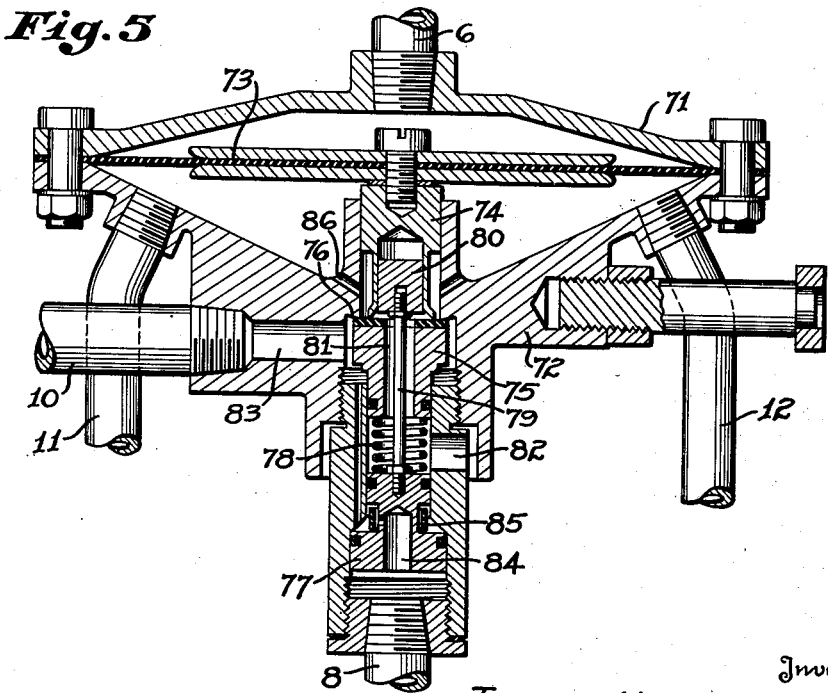
Figure 5 is a vertical section through the trailer relay valve apparatus.

Now referring particularly to Figure 5 of the drawings, I have therein illustrated how the service line 6 and emergency line 8, which lead to the trailer, may thereby be utilized to control operation of the trailer brakes through relay valve mechanism 71. Any usual or preferred type of relay valve mechanism may be utilized, but I prefer to employ that relay emergency air brake valve which is described and claimed in my copending application, Serial Number 769,036, filed October 16, 1947. Such an apparatus comprises a casing 72 in which is mounted a diaphragm 73, to the upper side of which is connected the service line 6. From the lower side of the diaphragm lines 11 and 12 lead to the brake cylinders. The diaphragm 73 is attached to a follower member 74, which in the position illustrated is engaging a packing on a valve member 75, which valve member is also seated against a seat 76 of the casing. The valve member 75 is a part of a valve means which includes the piston member 77 which is normally urged upwardly, as viewed in Figure 5, by air pressure from the emergency line 8. Between the valve members 75 and the piston 77 there is provided the spring 78 which normally urges these members apart. A rod 79 is attached to the piston 77 and carries the plug 80, which in another operating position is adapted to close an exhaust port 81 which passes through the valve member 75 to the exhaust port 82. A lateral port 83 is provided for connection with line 10 which leads to the trailer tank. A port 84 is provided through the lower part of the piston member 77 that discharges through the elastic check valve 85.

With such a relay apparatus the air pressure from the small tank 15 is taken through line 8 entering bore 84 and passes through port 83 to line 10 and the truck tank 9, so as to maintain the pressure of the truck tank at least as high as that of the small tank 15. Whenever air pressure is applied to the service line 6 diaphragm 73 and its follower 74 force valve member 75 downwardly to allow flow of pressure from the truck tank through ports 83 and through ports 86 to the space underneath diaphragm 73, and hence through lines 11 and 12 to the trailer brakes. When the pressure is exhausted from the service line 6 diaphragm 73 moves upwardly closing valve member 75 against its seat 77, and moving the follower 74 to uncover the exhaust passages 41 so that the air from the brake cylinders may be exhausted through lines 11 and 12 out of exhaust port 82.

With the apparatus thus described, the operations of trailers from trucks is free of dangers which in the past have arisen from breaking or uncoupling the emergency or service lines. With this apparatus, if the emergency line 8 is broken, so that the pressure in small tank 15 is exhausted, this tank is, as previously described, promptly cut off from its communication with the truck tank 2, thereby preventing loss of pressure in the truck tank. Moreover, when the pressure is released from line 8 the piston 77 is no longer urged upward, but is moved down by force of spring 78 to close plug 80 against the valve member 75, thereby shutting off the exhaust passages 81 and 82. Pressure in the trailer tank exerted against the upper side of the large end of piston 77 further forces this member downwardly to move valve member 75 from its seat 76, so as to cause the pressure in the trailer tank to be applied through lines 11 and 12 to the trailer brakes. Accordingly, any breakage of the emergency line results in prompt application of the trailer brake.

If service line 3 is broken, there is no effect on the apparatus until the truck operator attempts to apply the brakes. When this occurs the opening of the relay valve means, including diaphragm 54 (Figure 4), to connect the small tank 15 with the service line 6 merely results in exhausting the small tank 15. This has the effect, as previously described, of immediately disconnecting small tank 15 from the truck tank 2 so as to prevent loss of pressure from the truck tank, so that the truck brakes may operate. Moreover, loss of pressure from small tank 15 removes pressure from the emergency line 8. As a result thereof, the relay valve mechanism of Figure 5 causes prompt action of the trailer tank 9 to the trailer brakes, so that the trailer brakes are set. In this way, both the truck brakes and the trailer brakes become set, notwithstanding the breakage of the service line, and the fact that such line is broken does not become noticeable to the operator until he attempts to unset the brakes; whereupon he will find it possible to release the trailer brakes by operating valve 3ª, and therefore investigate the condition of the service line 6.

From the foregoing description it will be seen that the operation of the system requires a continuation of pressure within the small tank 15. In order to establish this operating condition, there is provided the charging line 87 (Figure 1), which includes the loading valve 88. Such loading valve is preferably located on the dash of the truck and is operated once after the trailer and its line have been connected to condition the apparatus for operation. The loading valve 88 may be any form of a valve member which may be operated to pass pressure from the truck tank directly into the small tank 15, and in the drawings (Figure 2) as indicated, is formed of a plunger valve means 89, in which the plunger is provided with sealing rings 90 and 91. When the loading valve 88 is operated to apply pressure to small tank 15 pressure is established in line 52 to position the valve mechanism of Figure 3 in the position illustrated, wherein the valve member 27 is uncovered from the orifice 24 to allow future feeding of the small tank 15 from the tank 2 through this orifice. The loading valve 89 should then be closed to allow for proper operation of the apparatus.

I claim:

1. In a control apparatus for the brakes of a truck and trailer, a service line and an emergency line extending from the truck to the trailer, means for connection of said lines to a source of pressure, said means including an orifice of smaller diameter than either of said lines, said orifice having an inlet side connected to said source of pressure and an outlet side connected to both said service line and said emergency line, said means including a first valve member movable by pressure to close the flow of air through said orifice and movable on release of said pressure to open the flow through said orifice, a second valve member controlled by pressure from the outlet side of said orifice to shut off pressure to said first valve member, and movable on loss of pressure from the outlet side of said orifice to allow application of pressure to said first valve member, and a pneumatically actuated relay valve in said service line and forming a means for connecting said service line to said emergency line.

2. In a control apparatus for the brakes of a truck and trailer, a service line and an emergency line extending from the truck to the trailer, means for connection of said lines to a source of pressure, said means including an orifice of smaller diameter than either of said lines, said orifice having an inlet side connected to said source of pressure and an outlet side connected to both said service line and said emergency line said means including a first valve member movable by pressure to close the flow of air through said orifice and movable on release of said pressure to open the flow through said orifice, a second valve member controlled by pressure from the outlet side of said orifice to shut off pressure to said first valve member, and movable on loss of pressure from the outlet side of said orifice to allow application of pressure to said first valve member, and a pneumatically actuated relay valve in said service line and forming a means for connecting said service line to said emergency line, a valve control line for connecting said second valve member to a source of pressure, said second valve member being responsive to pressure from said valve control line to also shut off pressure from said first valve member.

3. In a control apparatus for the brakes of a truck and trailer, a service line and an emergency line extending from the truck to the trailer, means for connection of said lines to a source of pressure, said means including an orifice of smaller capacity than either said service line or emergency line, said orifice having an inlet side connected to said source of pressure and an outlet side connected to both said service line and said emergency line, said means also including a first valve member movable to control the flow through said orifice, said means including a connection from said source of pressure to said first valve member to close the same, a second valve member for closing said latter connection, said second valve member being movable to closed position by pressure from the outlet side of said orifice, a diaphragm actuated relay valve in said service line and forming a means for connecting said service line to said emergency line, and a valve control line leading to said diaphragm.

4. In a control apparatus for the brakes of a truck and trailer, a service line and an emergency line extending from the truck to the trailer, means for connection of said lines to a source of pressure, said means including an orifice of smaller capacity than either said service line or emergency line, said orifice having an inlet side connected to said source of pressure and an outlet side connected to both said service line and said emergency line said means also including a first valve member movable to control the flow through said orifice, said means including a connection from said source of pressure to said first valve member to close the same, a second valve member for closing said latter connection, said second valve member being movable to closed position by pressure from the outlet side of said orifice, a diaphragm actuated relay valve in said service line and forming a means for connecting said service line to said emergency line, a valve control line leading to said diaphragm, and a valve control line from said source to said second valve member for closing the same.

5. In a control apparatus for the brakes of a truck and trailer, a service line and an emergency line extending from the truck to the trailer, a source of pressure on the truck, means connecting said source of pressure to said service line and emergency line, said orifice having an inlet side connected to said source of pressure and an outlet side connected to both said service line and said emergency line, said means including an orifice of relatively smaller capacity than the capacity of either the service line or the emergency line, said means including the first valve member movable by pressure from said truck tank to close the flow through said orifice and movable on release of pressure from said truck tank to allow flow through said orifice, a second valve member movable by pressure from the outlet side of said orifice to shut off the truck tank from the first valve member, a diaphragm actuated relay valve in said service line, and means for connecting said service line to said emergency line, and a valve control line leading to said diaphragm actuated valve for operating the same.

6. In a control apparatus for the brakes of a truck and trailer, a service line and an emergency line extending from the truck to the trailer, a source of pressure on the truck, means connecting said source of pressure to said service line and emergency line, said means including an orifice of relatively smaller capacity than the capacity of either the service line or the emergency line, said orifice having an inlet side connected to said source of pressure and an outlet side connected to both said service line and said emergency line, said means including the first valve member movable by pressure from said truck tank to close the flow through said orifice and movable on release of pressure from said truck tank to allow flow through said orifice, a second valve member movable by pressure from the outlet side of said orifice to shut off the truck tank from the first valve member, a diaphragm actuated relay valve in said service line and providing means for connecting said service line to said emergency line, a valve control line leading to said diaphragm actuated valve for operating the same, and a separate valve control operating line connecting said truck tank to the second valve member.

7. A control apparatus of the class described, said control apparatus comprising, a body having an inlet for connection to a source of fluid pressure, and an outlet for fluid under pressure with a passage connecting the inlet and outlet, a valve movable to close said passage and normally maintained in the open position, said body providing a chamber adapted to being alternately vented to the atmosphere and connected to the fluid pressure at said inlet, said valve being adapted to be closed by fluid pressure in said chamber, valve means movable alternately into a first position in which said chamber is vented and closed off from the source of fluid pressure, and into a second position in which said chamber is connected with said fluid pressure, and means operated by fluid pressure to maintain said valve means in said first position, and operated by loss of fluid pressure to move said valve means to its second position.

8. A control apparatus of the class described, said control apparatus comprising, a body having an inlet for connection to a source of fluid pressure, and an outlet for fluid under pressure with a passage connecting the inlet and outlet, a valve movable to close said passage and normally maintained in the open position, said body providing a chamber adapted to being alternately vented to the atmosphere and connected to the fluid pressure at said inlet, said valve being adapted to be closed by fluid pressure in said chamber, valve means movable alternately into a first position in which said chamber is vented while said chamber is closed off from the source of fluid pressure and into a second position in which said vent is closed and said chamber connected with said fluid pressure, means operated by fluid pressure to maintain said valve means in said first position and operated by loss of fluid pressure to move said valve means to its second position, and means for connecting the outlet to said pressure responsive means whereby the same is operated by loss of pressure at said outlet.

9. A control apparatus of the class described, said control apparatus comprising, a body having an inlet for connection to a source of fluid pressure, and an outlet for fluid under pressure with a passage connecting the inlet and outlet, a valve movable to close said passage and normally maintained in the open position, said body providing a chamber adapted to being alternately vented to the atmosphere and connected to the fluid pressure at said inlet, said valve being adapted to be closed by fluid pressure in said chamber, valve means movable alternately into a first position in which said chamber is vented while said chamber is closed off from the source of fluid pressure and into a second position in which said vent is closed and said chamber connected with said fluid pressure, means operated by fluid pressure to maintain said valve means in said first position and operated by loss of fluid pressure to move said valve means to its second position, and an orifice between the inlet and outlet.

10. A control apparatus of the class described, which apparatus comprises, means providing a fluid inlet, a chamber, and a fluid outlet, a valve member movable alternately into two positions, in one position closing communication between the inlet and said chamber, said valve member having an exhaust opening through said valve member which is opened in said one position, said valve member being movable into such a position wherein the inlet is connected with said chamber and said exhaust opening closed, a valve controlling communication between the inlet and said outlet, said valve being movable to the closed position by pressure in said chamber.

THEODORE HUBBARD AFFLECK.

References Cited in the file of this patent

UNITED STATES PATENTS

| Number | Name | Date |
|---|---|---|
| 1,438,317 | Lewis | Dec. 12, 1922 |
| 1,461,042 | McWhither | July 10, 1923 |
| 1,469,585 | McCune | Oct. 2, 1923 |
| 1,765,634 | Stewart | June 24, 1930 |
| 1,797,431 | Mathieson | Mar. 24, 1931 |
| 2,081,542 | Kidney | May 25, 1937 |
| 2,084,707 | Robinson | June 22, 1937 |
| 2,160,766 | Thomason | May 30, 1939 |
| 2,227,297 | Coy | Dec. 31, 1940 |
| 2,280,140 | Wilson | Apr. 21, 1942 |
| 2,335,825 | Eaton et al. | Nov. 30, 1943 |
| 2,358,895 | Vorech | Sept. 26, 1944 |
| 2,407,890 | McClure | Sept. 17, 1946 |
| 2,418,743 | Baker | Apr. 8, 1947 |
| 2,426,212 | Hedene | Aug. 26, 1947 |
| 2,451,139 | Williams et al. | Oct. 12, 1948 |
| 2,562,370 | Seale | July 31, 1951 |